United States Patent [19]
Klimbacher

[11] Patent Number: 6,086,027
[45] Date of Patent: Jul. 11, 2000

[54] SUPPORT

[75] Inventor: Walter Klimbacher, St. Veit/Glan, Austria

[73] Assignee: Hagen Berger, Pörtschach, Austria

[21] Appl. No.: 09/214,653

[22] PCT Filed: May 6, 1998

[86] PCT No.: PCT/AT93/00116

§ 371 Date: Jan. 6, 1999

§ 102(e) Date: Jan. 6, 1999

[87] PCT Pub. No.: WO98/50729

PCT Pub. Date: Nov. 12, 1998

[30] Foreign Application Priority Data

May 7, 1997 [AT] Austria ................................ A786/97

[51] Int. Cl.$^7$ .................................................. F16M 11/38
[52] U.S. Cl. .............................. 248/166; 42/94; 211/189; 248/164; 248/188; 248/188.6
[58] Field of Search .................. 248/166, 164, 248/163.2, 188, 188.6; 108/115, 162; 211/200, 189; 42/94; 89/40.06, 37.04

[56] References Cited

U.S. PATENT DOCUMENTS

| | | |
|---|---|---|
| 2,847,909 | 8/1958 | Kester . |
| 2,870,683 | 1/1959 | Wilson ........................................ 89/40 |
| 3,016,802 | 1/1962 | Grunenberg ............................... 89/40 |
| 3,156,062 | 11/1964 | Stevenson et al. . |
| 3,233,517 | 2/1966 | Morrison ..................................... 89/40 |
| 3,767,149 | 10/1973 | Hill .......................................... 248/49 |
| 3,863,376 | 2/1975 | Dalmaso . |
| 4,506,466 | 3/1985 | Hall ............................................ 42/94 |
| 4,967,497 | 11/1990 | Yakscoe ..................................... 42/94 |
| 5,123,550 | 6/1992 | Nodskov et al. ......................... 211/189 |
| 5,311,693 | 5/1994 | Underwood ................................. 42/94 |
| 5,317,826 | 6/1994 | Underwood ................................. 42/94 |
| 5,406,732 | 4/1995 | Peterson . |
| 5,507,111 | 4/1996 | Stinson et al. ............................. 42/94 |
| 5,913,668 | 6/1999 | Messer ....................................... 42/94 |
| 5,930,932 | 8/1999 | Peterson ..................................... 42/94 |
| 5,930,933 | 8/1999 | Schleicher ................................. 42/94 |

FOREIGN PATENT DOCUMENTS

| | | |
|---|---|---|
| 9836610 | 5/1951 | France . |
| 2560965 | 2/1985 | France . |
| 2645619 | 10/1990 | France . |
| 397026 | 6/1924 | Germany . |
| 9406979 | 9/1994 | Germany . |
| 276844 | 4/1927 | United Kingdom . |

*Primary Examiner*—Ramon O Ramirez
*Assistant Examiner*—Tan Le
*Attorney, Agent, or Firm*—Friedrich Kueffner

[57] ABSTRACT

A support device (1) for a weapon, a telescope, a telephoto lens, or similar object (2) is described. The legs of the device are connected pivotably to each other and create a cradle for the object. Four rods (3–6) are provided as legs, which are connected in pairs to each other by joints (9, 10, 13, 14) on two levels, where, in the collapsed state, the two joint axes (11, 12) on one level are parallel to each other but offset by 90° to the joint axes (15, 16) on the other level, which are also parallel to each other.

22 Claims, 4 Drawing Sheets

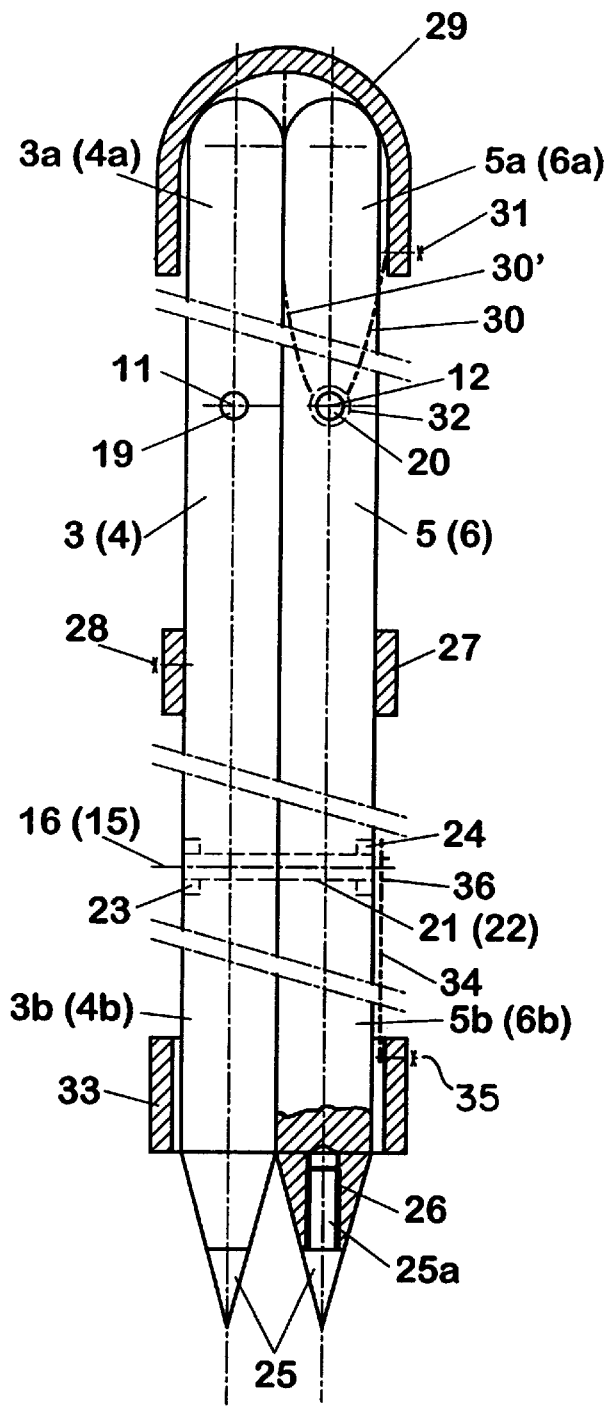
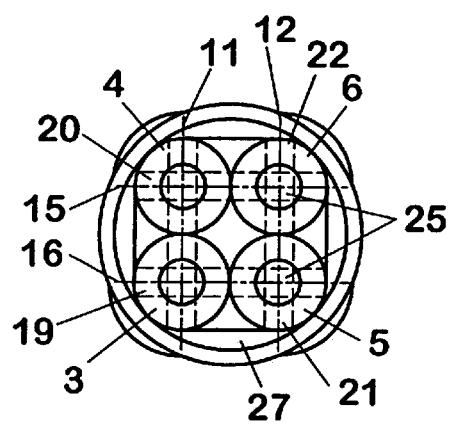
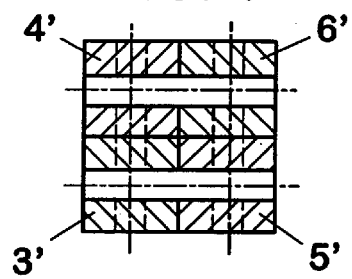
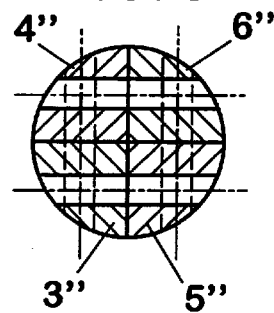

SUPPORT

The invention pertains to a support device for a weapon, a telescope, a telephoto lens, or similar object, with legs which are pivotably connected to each other and which create a cradle for the object.

To increase the aiming accuracy or to avoid wobbling while viewing an object, one-legged and two-legged supports as well as three-legged tripods are known for the support of weapons, binoculars, telescopes, telephoto lenses, etc. One-legged supports suffer from the disadvantage that they tend to tip over or slide to one side unless they are set up in a precisely upright position. Tripods must be equipped with a head part, which must be adjustable and lockable in both the horizontal and vertical directions, which increases the cost of the design.

The task of the invention is to create a support device of the general type described above which can be built and manipulated easily; which, in the expanded state, makes it possible to adjust the height of the support level above the ground in a continuously variable manner; and which, in the collapsed state, forms a sturdy walking stick.

This task is accomplished in accordance with the invention in that four rods are provided as legs, which are connected to each other in pairs by joints on two levels, where, in the collapsed state, the two joint axes on one level are parallel to each other but are offset by approximately 90° to the two joint axes on the other level which are also parallel to each other. As a result of this design, a compact walking stick is obtained in the collapsed state, in which all four rods nest tightly together. Nevertheless, it is extremely easy to unfold the device, as a result of which a stable support is obtained. At the same time, the design of the support device is extremely simple and sturdy.

To create an especially sturdy cradle which holds the object in a form-locking manner, it is advantageous for the upper end sections of the rods to cooperate in pairs in the expanded state to form forks above the one level. Thus, two forks are formed, one behind the other, when the rods are unfolded, so that a telescope tube or a weapon can be well supported. It can also be advisable in this case for the upper end sections of the rods to have a length of 10–26 cm, preferably of 18 cm. These dimensions make it possible for standard weapons, binoculars, telescopes, telephoto lenses, or the like to be placed in position and supported extremely efficiently.

To ensure that the support device can be set up or anchored effectively on the ground, it has also proven to be favorable for the bottom ends of the rods to form two forks below the other level after the rods have been unfolded. It has been found to be advisable here for the bottom sections of the rods to have a length of 4–20 cm, and preferably of 12 cm.

In accordance with a preferred embodiment, it is advantageous for the rods to be of equal length and to be, for example, 1.5–2 m long, and preferably 1.65–1.7 m long. As a result, it becomes possible to adjust the support height quickly and easily to the desired level for a standing, sitting, or lying user of the support device.

To ensure that the rods are held reliably together in the collapsed state, it has also been found favorable for the rods, in the collapsed state, to bend or twist about 180° around the center longitudinal axis of the support device. As result of this intrinsic pretension, the rods nest tightly against each other, under pressure, when in the collapsed state.

In another preferred embodiment, it is advantageous for two of the rods to be shorter than the other two and for the other level to be, for example, approximately at the center point of the other two rods. These other two, longer, rods, furthermore, can consist of tubes which can be slid or pushed into each other in a telescoping manner. In this way, the structural height of the support device can be reduced by about half for transport.

It is advantageous for the joints to be formed simply by screw connections. If one of the rods is damaged and must be replaced, the replacement can be made quickly and easily at any time by unscrewing the screw.

Conversely, it has also been found to be favorable for the joints to be formed by riveted connections. As a result, an extremely sturdy, wobble-free, hinged connection can be obtained.

The rods can be designed with a circular cross section, which makes them simple to manufacture.

According to another easy-to-manufacture and warp-resistant design of the rods, they have a square cross section.

A design which is favorable especially in terms of handling consists in giving the rods a quarter-round cross section, as a result of which, after the rods have been collapsed, they form a walking stick with a circular cross section overall.

It is advantageous to make the rods of wood, preferably pine or spruce. Pine and spruce are characterized by low density but high mechanical strength and are therefore especially suitable for the production of the rods.

To obtain rods which are light in weight but still quite rigid, it is also favorable for the rods to be made of plastic, preferably a fiber-reinforced plastic, or out of light metal or a light-metal alloy.

So that the support device can be firmly anchored in the ground at the setup site, it is also advantageous for each rod to have a steel tip at its bottom end.

To hold the rods together in the collapsed state and thus to promote the use of the device as a walking stick, it is also favorable to provide a cover cap, which can be placed over the top end sections after the rods have been collapsed. For the same purpose, it is also advantageous to provide a retaining ring, which can be pushed over the lower end sections after the rods have been collapsed.

To limit the extent to which the rods can move as they are being unfolded, finally, it is advantageous for the rods to be connected to each other in pairs by bands, preferably rubber bands, in the area of the lower joints.

The invention is described in greater detail below on the basis of the preferred exemplary embodiments illustrated in the drawings, although the invention is not limited to them:

FIG. 2 shows a view, partially in cross section, of the support device according to FIG. 1 in the collapsed state;

FIG. 3 shows a bottom view of the support device according to FIG. 2;

FIGS. 4 and 5 show two alternative cross-sectional forms of rods which can be used in the support device;

Figure 1:
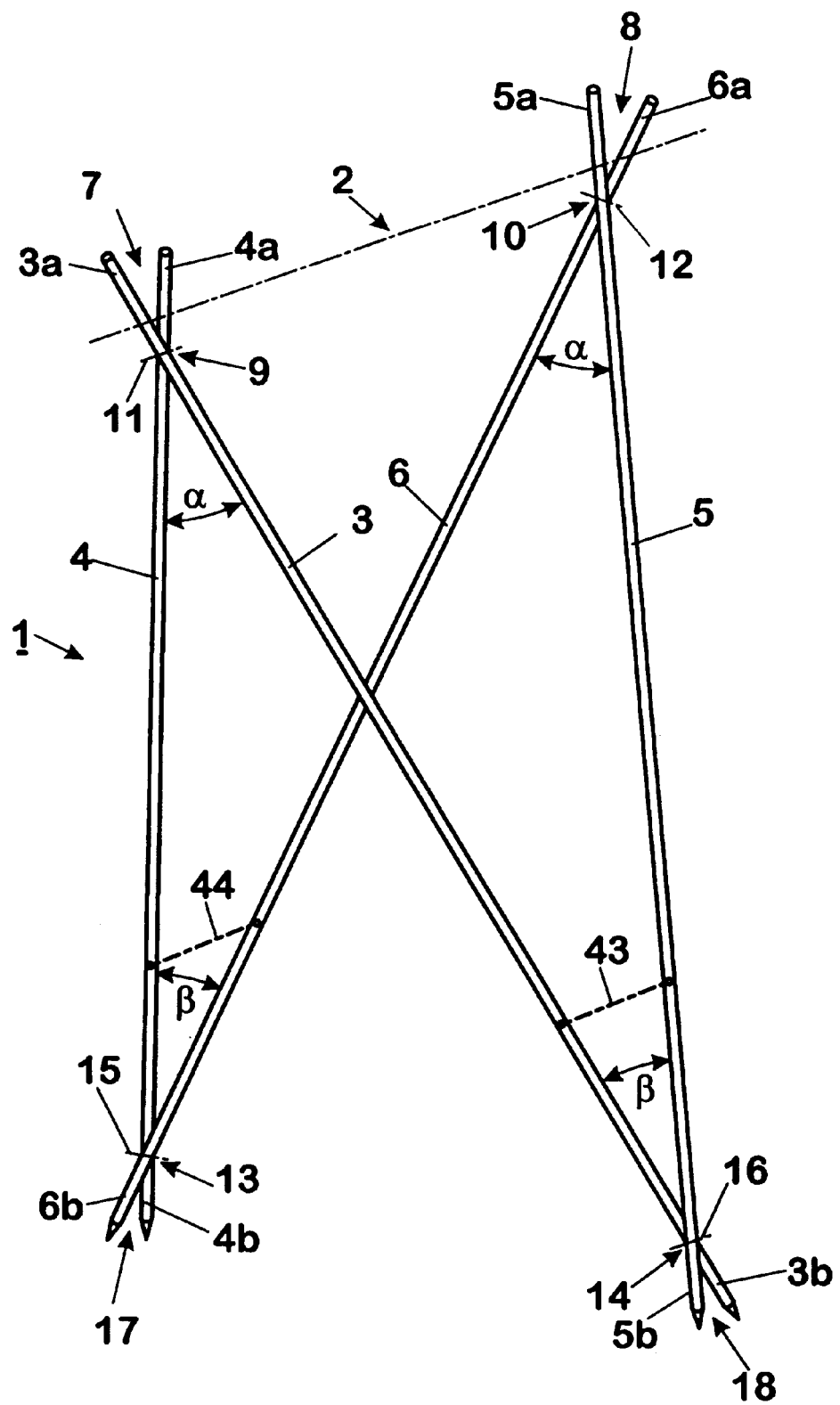
FIG. 1 shows a perspective view of a support device in the unfolded state.

FIG. 1 shows a support device 1 in the unfolded state for a long object 2, shown in dash-dot line, especially a weapon, binoculars, a telescope, or a telephoto lens. Object 2 lies in a cradle, which is created by two upper forks 7, 8, formed by four legs in the form of rods 3–6. Specifically, rods 3, 4 and rods 5, 6 are each connected pivotably to each other by way of upper joints 9, 10 on an upper level defined by their joint axes 11, 12, whereas rods 3, 5 and rods 4, 6 are connected pivotably to each other by lower joints 13, 14 on another, lower, level defined by their joint axes 15, 16. Upper forks 7, 8 are formed by upper end sections 3*a*, 4*a*; 5*a*, 6*a* of rods 3, 4; 5, 6, which extend upward from the upper level, whereas lower end sections 3*b*, 5*b*; 4*b*, 6*b* of rods 3, 5; 4, 6, extending down from the other, lower, level, form lower forks 17, 18.

As can be seen in FIGS. 2 and 3, which illustrate rods 3–5 in the collapsed state of support device 1, joint axes 11, 12; 15, 16 extend in pairs, parallel to each other, but upper joint axes 11, 12 are offset by 90° with respect to lower joint axes 15, 16. In the case of upper joints 9, 10, it can be seen that rods 3, 4 and rods 5, 6 enclose the same angle a in the unfolded state, whereas;, in the case of lower joints 13, 14, we see that rods 3, 5 and rods 4, 6 each enclose an angle β. When support device 1 is unfolded, which is done by simultaneously spreading rods 3–6 apart, it is possible to spread rods 3, 4; 5, 6 away from each other up to a certain limiting value at which, for example, angles α and β are the same, e.g., 60°. In this case, joints 9, 10; 13, 14 will form the corners of a tetrahedron. When one of the two angles α or β is made larger than this, the other angle automatically becomes smaller to a corresponding extent.

Rods 3–6 are preferably 1.5–2 m long, even more preferably 1.65–1.7 m long. In the embodiment illustrated in FIGS. 1–3, rods 3–6 preferably have a circular cross section. Upper end sections 3*a*–6*a* of rods 3–6 are 10–25 cm long, and preferably 18 cm long, whereas lower end sections 3*b*–6*b* are 4–20 cm long, and preferably 12 cm long.

Rods 3–6 have holes 19–22 at their joints 9, 10; 13, 14 to accept connecting screws or rivets along with spacers and/or lock washers (not shown). These connections can also be countersunk, as indicated by depressions 23, 24 in broken line in FIG. 2 by way of example (merely in schematic fashion).

According to FIG. 2, the ends of upper end sections 3*a*–6*a* are rounded; in contrast, conical steel tips 25 with a threaded shaft 25*a* are force-fit or screwed into threaded holes 26 in the tapered ends of lower end sections 3*b*–6*b*. Thus support device 1 can be firmly anchored in the ground at the setup site.

So that support device 1 can be easily and conveniently handled in the collapsed state, a rubber band 27 is provided according to FIG. 2. This rubber band is attached to one of the four rods, such as rod 3, by means of a screw indicated at 28, and is provided at its ends with a Velcro closure (not shown) to hold rods 3–6 together under tension.

In addition, a cover cap 29 of hard rubber or (rigid)-elastic plastic is provided for upper end sections 3*a*–6*a*. Cover cap 29 is connected by, for example, a schematically indicated rubber band 30 to one of rods 3–6 so that it cannot be lost; one end of rubber band 30 can be attached to cover cap 29 by a rivet, indicated in FIG. 2 at 31, while the other end can be connected to the screw or rivet connection on one of rods 3–6, such as on rod 5, by a grommet 32. Instead of being provided on the outside of rods 3–6 as shown, the rubber band can also extend along the inside of the rods, that is, in the interior of folded-up support device 1, and continue all the way to cover cap 29, as illustrated in FIG. 2 for the sake of simplicity by dash-dot line 30'.

At lower end sections 3*b*–6*b*, a retaining ring 33 of hard rubber or elastic plastic is provided, which surrounds rods 3–6 when in the collapsed state; this ring is connected by a rubber band 34 to one of rods 3–6; one end of rubber band 34 can again be attached by a rivet indicated at 35 to retaining ring 33, while the other end can be attached to the screw or rivet connection on one of the rods, such as rod 5, by means of a grommet 36. Here, too, of course, rubber band 34 can be fastened on the inside of the rods, instead of on the outside as shown, so as to achieve a concealed attachment.

When support device 1 is in use, rubber band 27, cover cap 29, and retaining ring 33 can be easily removed or detached. After support device 1 has been collapsed, however, it can be used as a sturdy walking stick.

FIG. 4 shows rods 3'–6' with a square cross section, which gives support device 1 a very sturdy structure.

Rods 3"–6" shown in FIG. 5 have a quarter-round cross section, so that, in the collapsed state of the support device, a circular cross section is obtained overall, which rests very comfortably in the hand.

Figure 6:
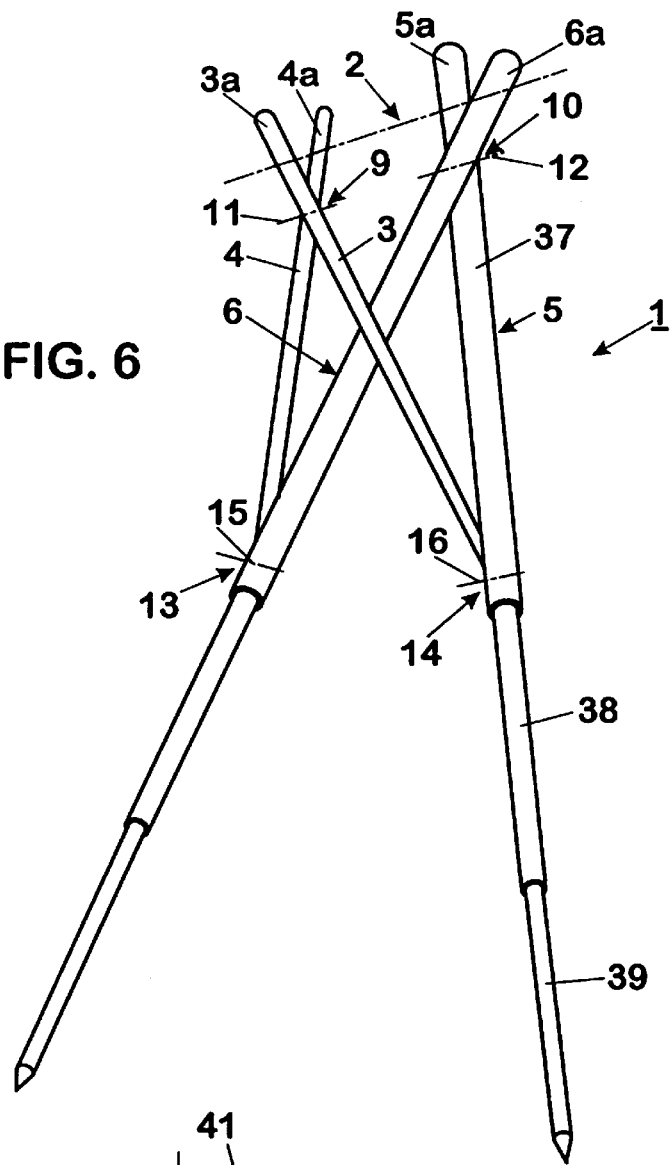
FIG. 6 shows a perspective view of another support device in the unfolded state.

In the case of the design of support device 1 illustrated in FIG. 6, two of the rods, namely, rods 3, 4, are only about half as long as they are in the design according to FIG. 1, whereas the two other, long rods 5, 6 consist in each case of, for example, three telescoping or sliding tubes 37–39, which can be held in place both in the collapsed and in the extended state in the conventional manner by means of pins, thumb-screws (not shown), or the like.

Figure 7:
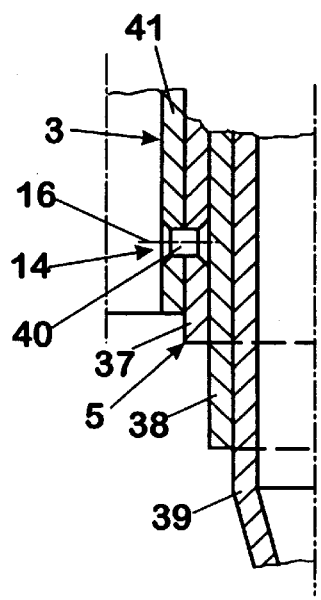
FIG. 7 shows a joint of the support device according to FIG. 6 on an enlarged scale, in cross section.

Here, as can be seen from FIG. 7 on the basis of a diagram of joint 14, at least lower joints 13, 14 are formed in each case by a countersunk rivet 40, which connects tube 37 of rod 5 (or 6) in pivotable fashion to rod 3 (or 4), also designed as a tube 41.

Of course, it is also possible for rods 5, 6 to be designed as single pieces and to be approximately twice as long as rods 3, 4; that is, it is possible for rods 5, 6 to be designed without the telescoping feature.

Figure 8:
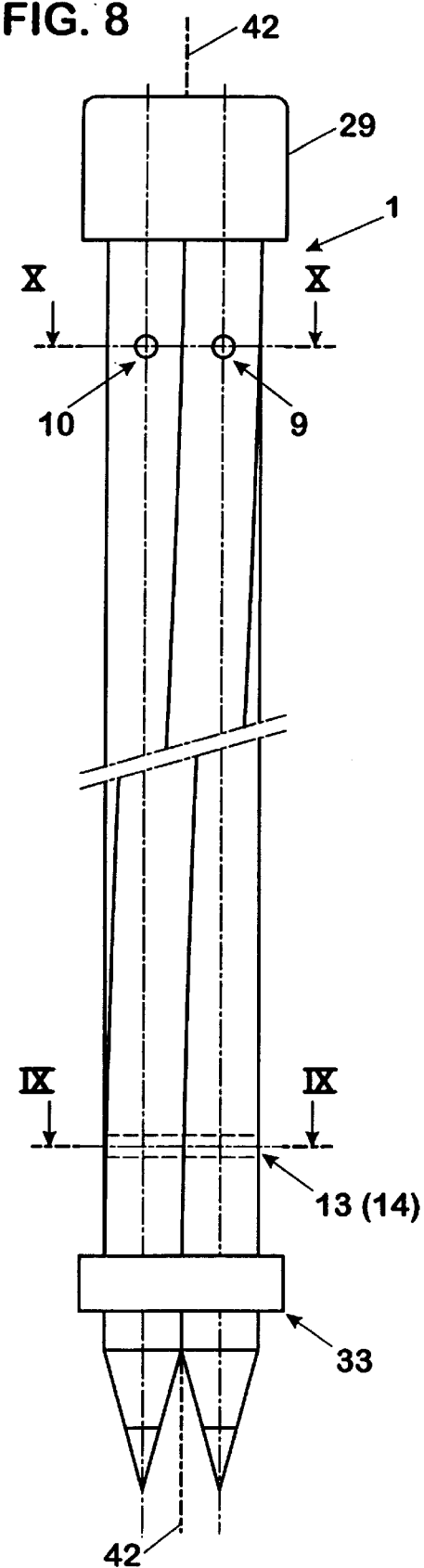
FIG. 8 shows a view of a modified support device in the collapsed state.
Figure 10:
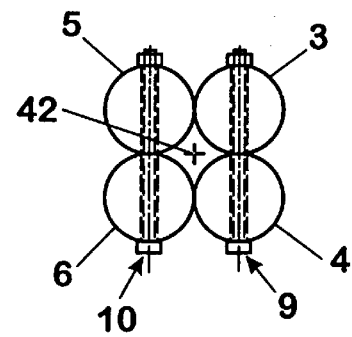
FIGS. 9 and 10 show cross sections of this support device along lines IX—IX and X–X, respectively, of FIG. 8.
Figure 9:
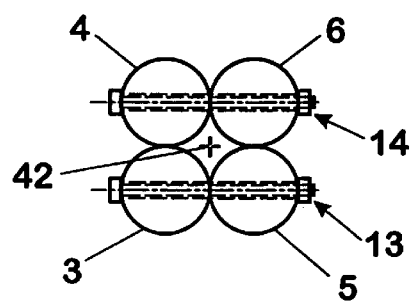

In the especially preferred embodiment of support device 1 according to FIGS. 8–10, which corresponds essentially to that according to FIGS. 1–3, so that a detailed description can be omitted, all four rods 3, 4, 5, 6 are, in the collapsed state, bent or twisted around center longitudinal axis 42 of support device 1 by a total of 180° between the level of lower joints 13, 14 and the level of upper joints 9, 10. As a result, as rods 3–6 rise from the level of lower joints 13, 14, they are on the diametrically opposite side of the device by the time they reach the level of upper joints 9, 10; this can be seen easily from the illustrations in FIGS. 9 and 10. This "twist" of support device 1 is a simple way of ensuring that rods 3–6 are held together tightly when in the collapsed state, which means that there is no longer any need for rubber band 27 according to FIG. 1. This measure also makes it easier to manipulate support device 1, not only because the pretension makes it easier to separate and unfold rods 3–6, but also because the rods automatically nest against each other in the correct position when collapsed. The twist of rods 3–6 can be produced by first connecting the rods to each other in pairs at lower joints 13, 14, by twisting or bending them around 180° as they extend upward, and then by holding them in place in pairs at upper joints 9, 10.

Rods 3–6 (or 3'–6' or 3"–6") can be made of wood, preferably pine or spruce; of plastic, preferably fiber-reinforced plastic; or of light metal, preferably aluminum or an aluminum alloy. When plastic or light metal is used, the rods can have a tubular cross section. In the case of the design according to FIGS. 8–10, rods 3–6 are preferably made of wood, but possibly also of plastic.

As indicated schematically in FIG. 1 at 43 and 44, finally, rods 3, 5 and 4, 6, which are connected in pairs to each other at lower joints 13, 14, can also be connected to each other slightly above these joints 13, 14 by bands, especially rubber bands; as a result, a limitation is imposed regarding the extent to which rods 3–6 can be spread apart; and also, if desired, an elastic restoring force can be produced, which makes it easier to collapse rods 3–6. Of course, rubber bands 43, 44 of this type can also be provided advantageously in the other embodiments of support device 1, especially that according to FIGS. 8–10.

A cover cap 29 and/or a retaining ring 33, especially with a concealed attachment of the rubber bands, can also be provided for support device 1 according to FIGS. 8–10.

What is claimed is:

1. A collapsible support device for an elongate object, the support device comprising:

four rods each having first upper ends and second lower ends arranged to form a tetrahedron configuration in an unfolded state of the support device;

first joints directly pivotably connecting the first upper ends to one another in pairs and having a first joint axis extending through both first upper ends of each pair and second joints directly pivotably connecting the second lower ends to one another in pairs and having a second joint axis extending through both second lower ends of each pair;

wherein, in the collapsed state of the support device, the first joint axes extend parallel to one another in a first plane and wherein the second joint axes extend parallel to one another in a second plane;

wherein the second joint axes are rotated by 90° within the second plane relative to the first joint axes;

wherein the second joints are positioned such that the second lower ends have second end sections projecting downwardly past the second plane;

wherein, in the unfolded state, the second end sections form two forks configured to secure the support device on the ground and wherein the first upper ends form a cradle for the elongate object.

2. The support device according to claim 1, wherein the first joints are positioned such that the first upper ends have first end sections projecting upwardly past the first plane and wherein the first end sections form two forks defining the cradle for the elongate object.

3. The support device according to claim 2, wherein the first end sections are 10–26 cm long and wherein the second end sections are 10–26 cm long.

4. The support device according to claim 1, wherein the four rods all have the same length.

5. The support device according to claim 4, wherein the four rods are 1.5–2 m long.

6. The support device according to claim 1, having a longitudinal center axis in the collapsed state, wherein the four rods in the collapsed state are twisted about the longitudinal center axis by a 180° turn.

7. The support device according to claim 1, wherein the first and second joints are screw connections or rivet connections.

8. The support device according to claim 1, wherein the four rods have a cross-section that is circular, square or quarter-round.

9. The support device according to claim 1, wherein at least one of the four rods consists of wood.

10. The support device according to claim 1, wherein at least one of the four rods consists of plastic.

11. The support device according to claim 1, wherein at least one of the four rods consists of a light metal or a light metal alloy.

12. The support device according to claim 1, wherein the second end sections have steel tips.

13. The support device according to claim 1, comprising a cover cap, placed onto the first upper ends in the collapsed state of the support device, and a retaining ring pushed onto the second end sections in the collapsed state of the support device.

14. The support device according to claim 1, comprising rubber bands connecting the pairs connected by the second joints at a location above the second joints.

15. A collapsible support device for an elongate object, the support device comprising:

four rods each having first upper ends and second lower ends arranged to form a tetrahedron configuration in an unfolded state of the support device, wherein two of the rods are shorter than the other two of the rods;

first joints directly pivotably connecting the first upper ends to one another in pairs and having a first joint axis extending through both first upper ends of each pair;

second joints directly pivotably connecting in pairs the second lower ends of the two shorter rods to approximately a center point of the other two rods and having a second joint axis extending respectively through the second lower end of the two shorter rods and the center point of the other rods;

wherein the first upper ends form a cradle for the elongate object;

wherein, in the collapsed state of the support device, the first joint axes extend parallel to one another in a first plane and wherein the second joint axes extend parallel to one another in a second plane;

wherein the second joint axes are rotated by 90° within the second plane relative to the first joint axes.

16. The support device according to claim 15, wherein the other two rods are comprised of telescoping tubes and the second lower ends of the other two rods have steel tips.

17. The support device according to claim 15, wherein the first joints are positioned such that the first upper ends have first end sections projecting past the first plane and wherein the first end sections form two forks defining the cradle for the elongate object.

18. The support device according to claim 15, wherein the first and second joints are screw connections or rivet connection.

19. The support device according to claim 15, wherein the four rods have a cross-section that is circular, square or quarter-round.

20. The support device according to claim 15, wherein at least one of the four rods consists of plastic.

21. The support device according to claim 15, wherein at least one of the four rods consists of a light metal or a light metal alloy.

22. The support device according to claim 15, comprising a cover cap, placed onto the upper first ends in the collapsed state of the support device.

* * * * *